(12) United States Patent
Zhao et al.

(10) Patent No.: US 10,828,770 B2
(45) Date of Patent: Nov. 10, 2020

(54) POWER DELIVERY SYSTEM FOR ELECTRIC VEHICLE CHARGING STATION

(71) Applicant: GM Global Technology Operations LLC, Detroit, MI (US)

(72) Inventors: Xiang Zhao, Novi, MI (US); Ningjian Huang, Bingham Farms, MI (US); Lei Zhang, Changsha (CN); Changfu Ye, Changsha (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 188 days.

(21) Appl. No.: 15/685,557

(22) Filed: Aug. 24, 2017

(65) Prior Publication Data

US 2019/0061542 A1 Feb. 28, 2019

(51) Int. Cl.
| | |
|---|---|
| *B25J 9/04* | (2006.01) |
| *B60L 53/22* | (2019.01) |
| *B60L 53/16* | (2019.01) |
| *B60L 53/31* | (2019.01) |
| *B60L 53/35* | (2019.01) |
| *B25J 5/02* | (2006.01) |
| *H02J 7/00* | (2006.01) |

(52) U.S. Cl.
CPC ............. *B25J 9/042* (2013.01); *B25J 5/02* (2013.01); *B25J 9/045* (2013.01); *B25J 9/046* (2013.01); *B60L 53/16* (2019.02); *B60L 53/22* (2019.02); *B60L 53/31* (2019.02); *B60L 53/35* (2019.02); *H02J 7/0027* (2013.01); *H02J 7/0042* (2013.01)

(58) Field of Classification Search
CPC .... H02J 7/0027; H02J 7/0042; H02J 2310/48; B25J 9/042; B25J 5/02; B25J 9/045; B25J 9/046; B60L 53/16; B60L 53/31; B60L 53/35; B60L 53/22; B60L 11/1824; B60L 11/1818; B60L 11/1838
See application file for complete search history.

(56) References Cited

U.S. PATENT DOCUMENTS

| | | | |
|---|---|---|---|
| 9,770,993 B2 * | 9/2017 | Zhao ................... | B60L 11/1846 |
| 2011/0077809 A1 * | 3/2011 | Leary ..................... | B60L 53/34 701/22 |
| 2012/0013300 A1 * | 1/2012 | Prosser ............... | B60L 11/1844 320/109 |
| 2012/0032635 A1 * | 2/2012 | Prosser .................. | B60L 53/18 320/109 |
| 2013/0076902 A1 | 3/2013 | Gao et al. | |

(Continued)

*Primary Examiner* — Drew A Dunn
*Assistant Examiner* — Sailesh Thapa
(74) *Attorney, Agent, or Firm* — Cantor Colburn LLP

(57) ABSTRACT

A vehicle charging station includes a track configured to extend across a plurality of vehicle parking spaces. The charging station further includes a movable charging apparatus supported by the track and translatable along the track between the plurality of vehicle parking spaces. The charging station further includes a first contact wire extending approximately parallel to the track. The charging station further includes a first conductor pole configured to couple the movable charging apparatus to the first contact wire at a plurality of locations along a width of the first contact wire. The first conductor pole is configured to move with the movable charging apparatus. In such a manner, a one-to-many charging station can be accomplished.

10 Claims, 10 Drawing Sheets

(56) References Cited

U.S. PATENT DOCUMENTS

2013/0088194 A1* 4/2013 Hunter ................ H02J 7/025
320/108
2014/0354229 A1* 12/2014 Zhao ................ B60L 11/1846
320/109

* cited by examiner

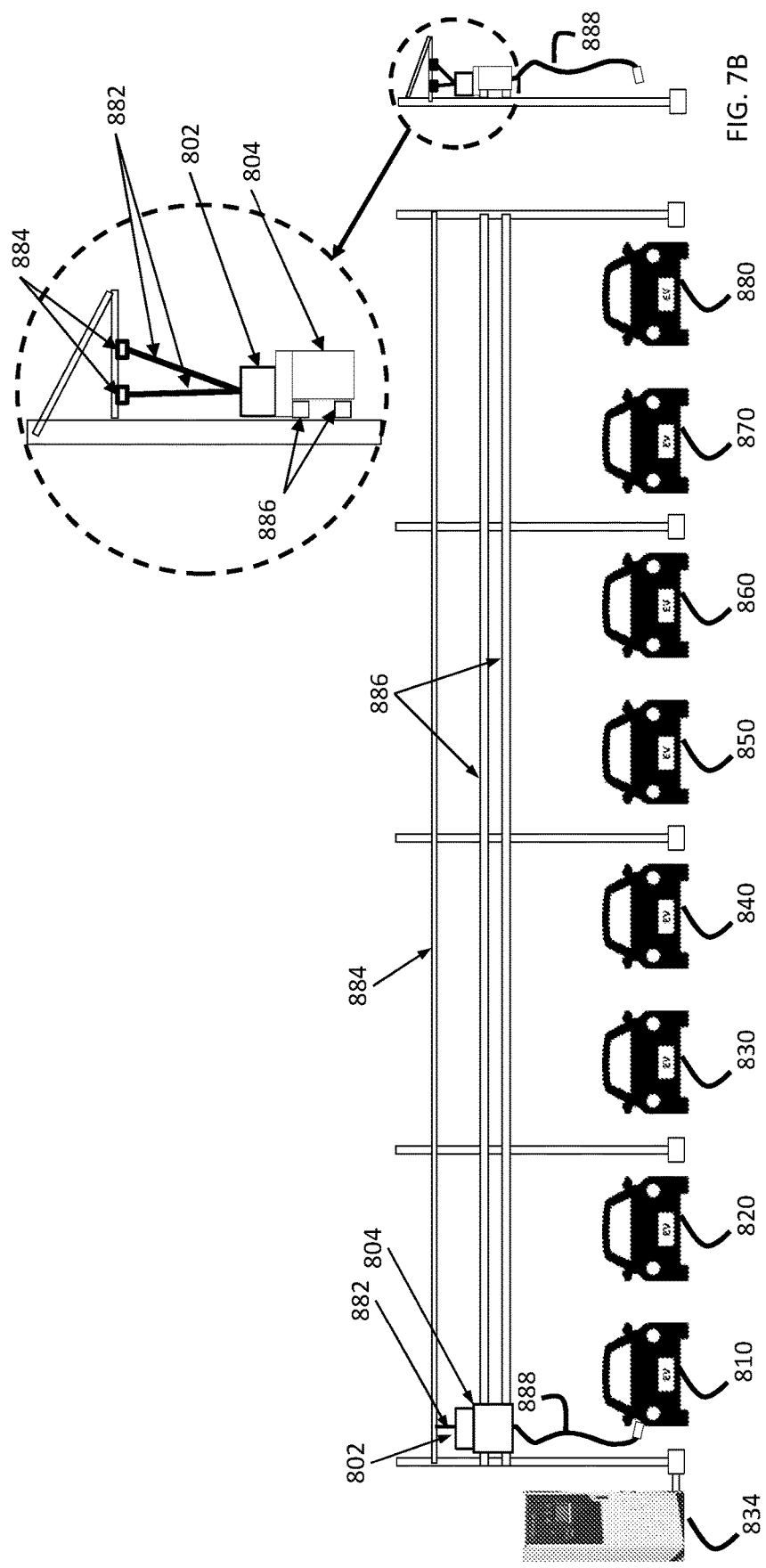

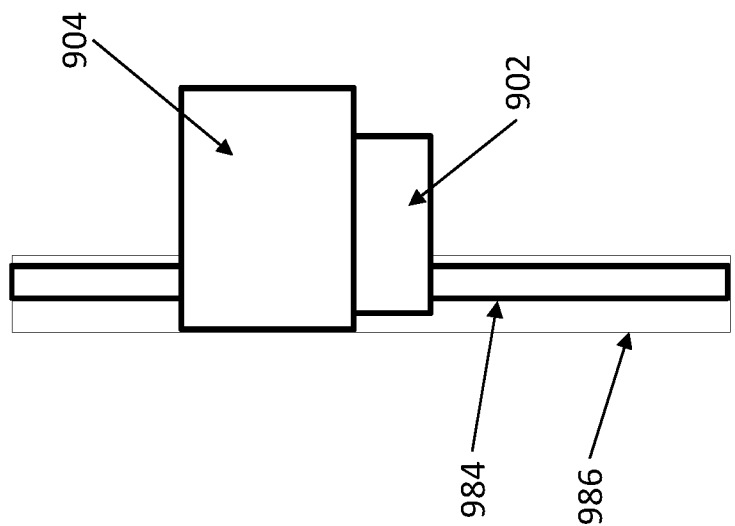
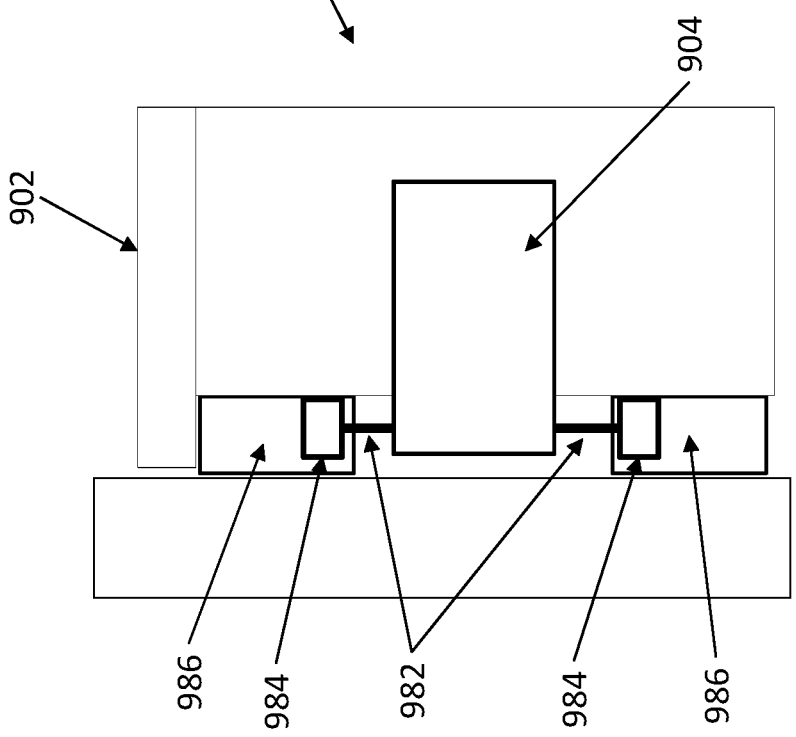
FIG. 8A
FIG. 8B

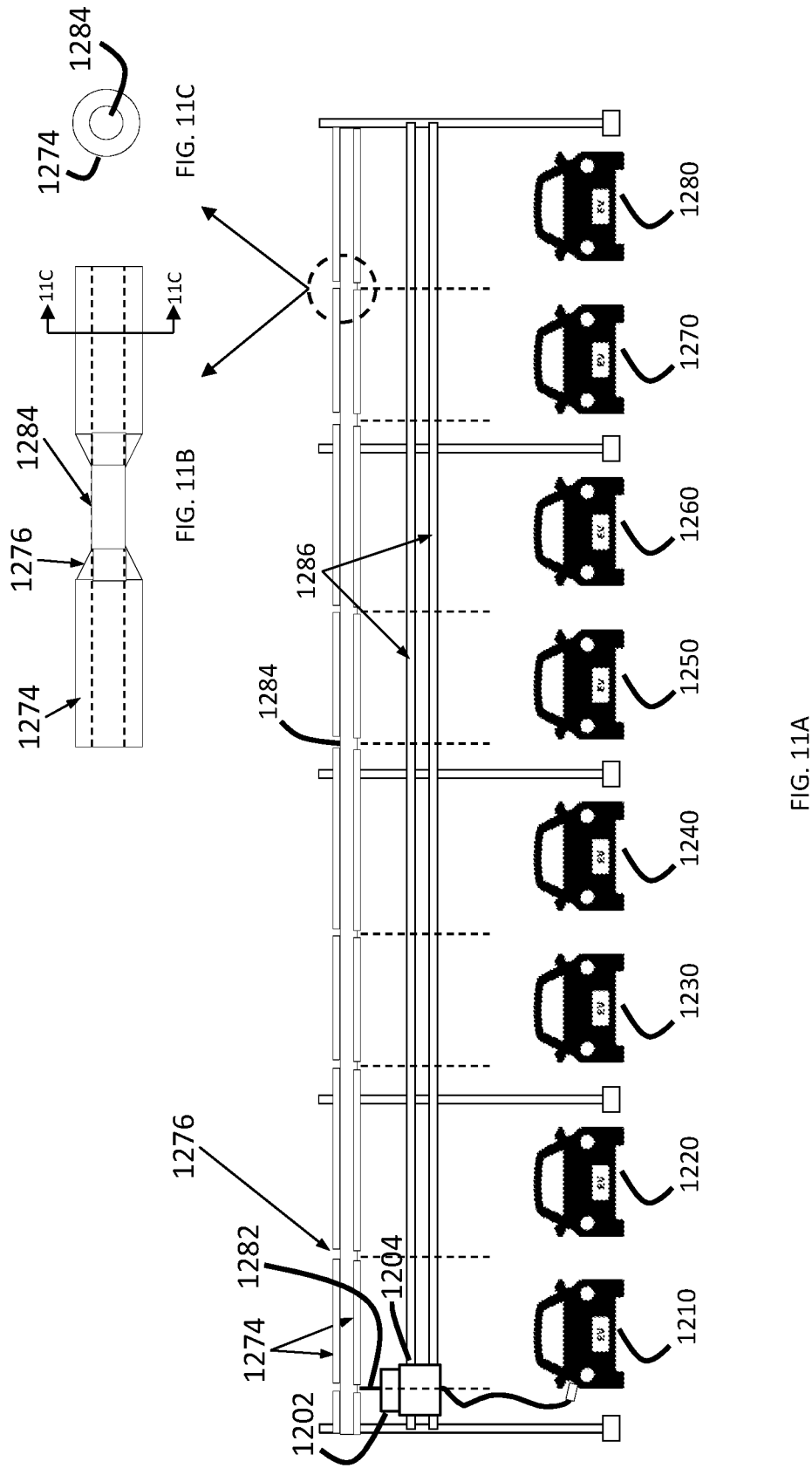

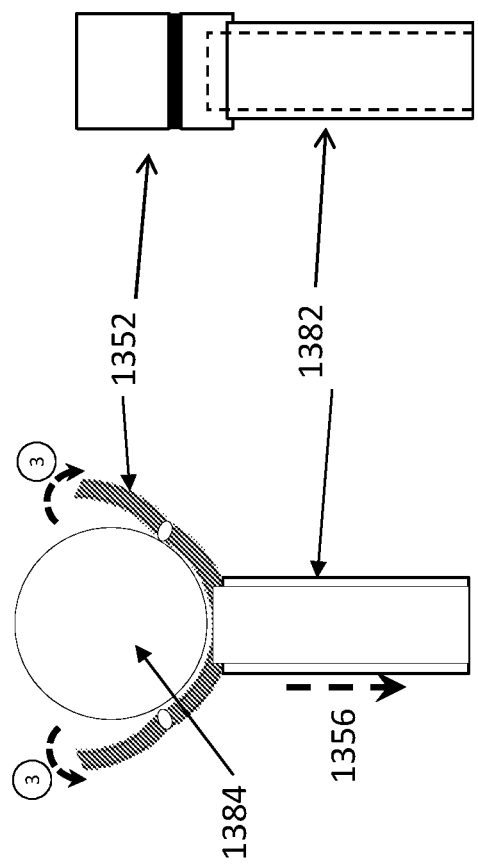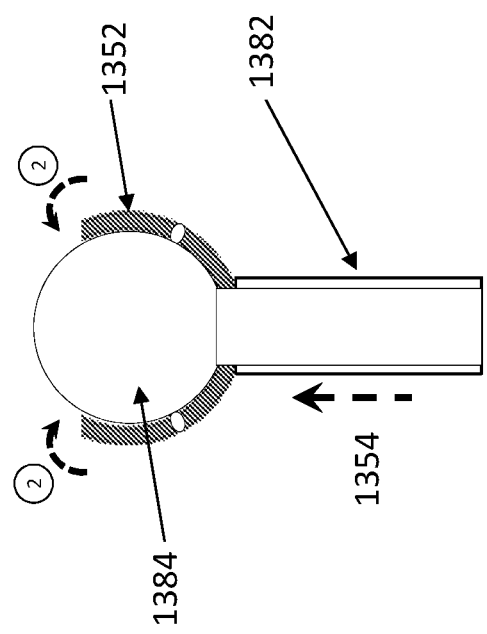

POWER DELIVERY SYSTEM FOR ELECTRIC VEHICLE CHARGING STATION

INTRODUCTION

The subject application relates to an electric vehicle charging station for a plurality of electric vehicles.

Various types of automotive vehicles, such as electric vehicles (EVs), extended-range electric vehicles (EREVs), and hybrid electric vehicles (HEVs) are equipped with an energy storage system that requires periodic charging. Typically, this energy storage system may be charged by connecting it to a power source, such as an AC supply line. While it may be advantageous to re-charge the vehicle's energy storage system before or after each vehicle use, it is sometimes desirable for the vehicle operator to re-charge the vehicle's energy storage system at a public location.

Accordingly, it is desirable to provide a charging solution that allows multiple vehicles to connect to a single power source.

SUMMARY

In one exemplary embodiment, a vehicle charging station includes a track configured to extend across a plurality of vehicle parking spaces. The charging station further includes a movable charging apparatus supported by the track and translatable along the track between the plurality of vehicle parking spaces. The charging station further includes a first contact wire extending approximately parallel to the track. The charging station further includes a first conductor pole configured to couple the movable charging apparatus to the first contact wire at a plurality of locations along a width of the first contact wire. The first conductor pole is configured to move with the movable charging apparatus. In such a manner, a one-to-many charging station can be accomplished.

In addition to one or more of the features described herein, further embodiments may include wherein the track is disposed on the ground.

In addition to one or more of the features described herein, further embodiments may include wherein the track is disposed above the ground, such that the movable charging apparatus is substantially located between the ground and the track.

In addition to one or more of the features described herein, further embodiments may include a second contact wire extending approximately parallel to the track.

In addition to one or more of the features described herein, further embodiments may include a second conductor pole configured to couple the movable charging apparatus to the second contact wire at a plurality of locations along a width of the second contact wire, wherein the first conductor pole is configure to move with the movable charging apparatus.

In addition to one or more of the features described herein, further embodiments may include wherein the second contact wire comprises a wire wrapped by an insulator; and the insulator comprises a plurality of cutouts that correspond to each of the plurality of vehicle parking spaces, such that the second conductor pole couples to the first contact wire via one of the plurality of cutouts.

In addition to one or more of the features described herein, further embodiments may include wherein the movable charging apparatus comprises a charger coupled to a driving unit, wherein the driving unit is configured to move the movable charging apparatus along the track.

In addition to one or more of the features described herein, further embodiments may include wherein the driving unit comprises a motor configured to move the movable charging apparatus along the track.

In addition to one or more of the features described herein, further embodiments may include a second movable charging apparatus supported by the track and translatable along the track between the plurality of vehicle parking spaces.

In addition to one or more of the features described herein, further embodiments may include wherein the first contact wire comprises a metal wire wrapped by an insulator; and the insulator comprises a plurality of cutouts that correspond to each of the plurality of vehicle parking spaces, such that the first conductor pole couples to the first contact wire via one of the plurality of cutouts.

In addition to one or more of the features described herein, further embodiments may include wherein the metal wire is selected from copper and aluminum; and the insulator comprises rubber.

In addition to one or more of the features described herein, further embodiments may include wherein the first conductor pole comprises a pair of connection pads coupled to the conductor pole; and the first conductor pole is arranged to connect and disconnect to the first contact wire via the connection pad.

In addition to one or more of the features described herein, further embodiments may include wherein: the pair of connection pads is configured to partially wrap around the contact wire when in the connected position.

In addition to one or more of the features described herein, further embodiments may include wherein the pair of connection pads is configured to move between the connected and disconnected state via vertical movement of the conductor pole.

In addition to one or more of the features described herein, further embodiments may include wherein the pair of connection pads are movable via a mechanical coupling to the conductor pole.

In addition to one or more of the features described herein, further embodiments may include wherein the pair of connection pads are movable via an electromagnetic coupling to the conductor pole.

In addition to one or more of the features described herein, further embodiments may include wherein the first conductor pole is configured to be movable along the width of the contact wire while in a disconnected state.

The above features and advantages and other features and advantages are readily apparent from the following detailed description when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 7A is a front view of an exemplary overhead mounted charging station of one or more embodiments;

FIG. 7B is a side view of an exemplary overhead mounted charging station of one or more embodiments;

FIG. 7C is a top view of an exemplary overhead mounted charging station of one or more embodiments;

FIG. 8A is a side view illustrating the coupling of an overhead mounted charging apparatus with contact wires;

FIG. 8B is a top view illustrating the coupling of an overhead mounted charging apparatus with contact wires;

FIG. 11A is a front view of an exemplary overhead mounted charging station of one or more embodiments;

FIG. 11B is a front detail view of a cutout of a contact wire of one more embodiments;

FIG. 11C is a side detail view of a cutout of a contact wire of one more embodiments;

FIG. 12A is a front view of a contact wire connecting apparatus in the connected position;

FIG. 12B is a front view of a contact wire connecting apparatus in the disconnected position; and FIG. 12C is a side view of a contact wire connecting apparatus.

DETAILED DESCRIPTION

The following description is merely exemplary in nature and is not intended to limit the present disclosure, its application or uses.

In accordance with an exemplary embodiment, one or more embodiments are shown of a power delivery system for a one-to-many electric vehicle charging station.

Many existing public charging facilities for electric vehicles involve the use of a single charger for each space for electric vehicles. Thus, if a public charging facility wants three customers to be able to charge their electric vehicles, they need to be able to provide three chargers. This can be disadvantageous for a few reasons. For example, chargers can be expensive. In addition, chargers can require a lot of electricity, possibly requiring an upgrade to a facility's electrical service.

One system that addresses such concerns is a one-to-many system. In such a system, a single charger has the capability of charging multiple electric vehicles.

Figure 1:
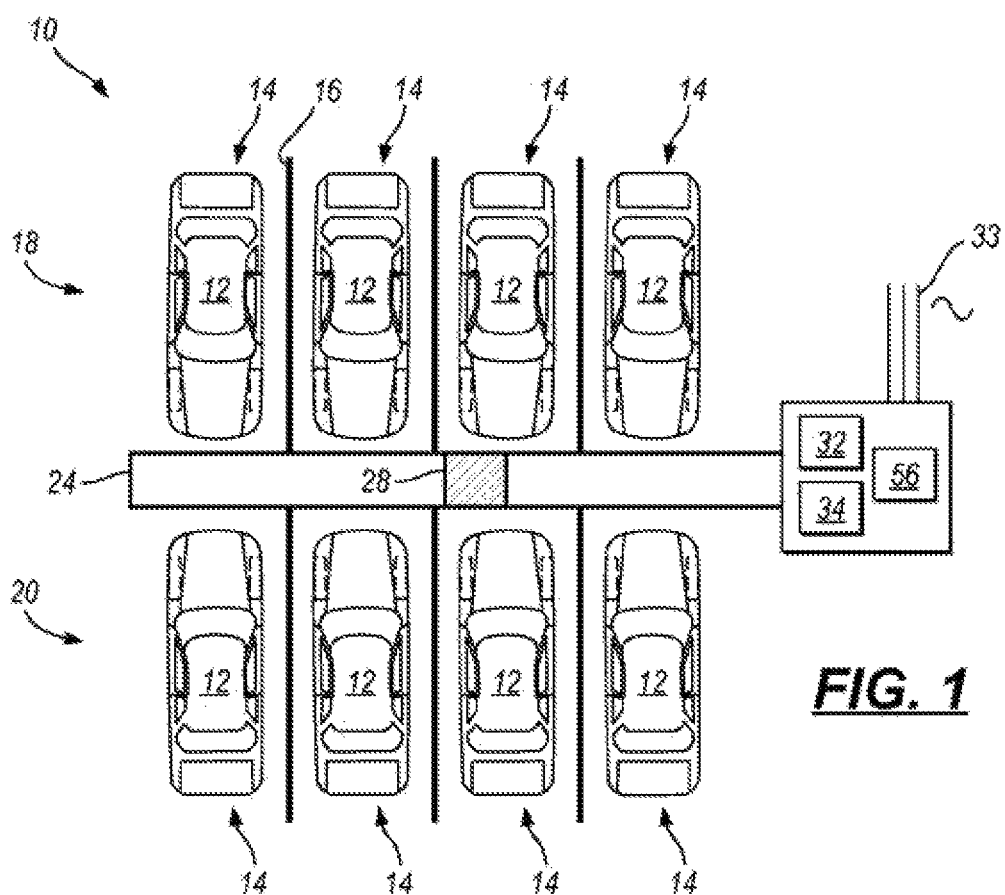
FIG. 1 is a schematic plan view of an electric vehicle charging station employing a ground mounted movable charging apparatus.

Referring to the drawings, FIG. 1 schematically illustrates an electric vehicle charging station 10 for charging or re-charging the primary energy storage device of a plurality of electric vehicles 12. As used herein, an electric vehicle 12 may encompass any vehicle that uses an electric motor as a source of power for vehicle propulsion. While an automobile will be used as the exemplary vehicle for the purpose of this description, other vehicles may similarly be used. Some examples of electric vehicles include, but are not limited to, electric-only electric vehicles (EVs), plug-in hybrid electric vehicles (PHEVs), extended range electric vehicles (EREVs). These vehicles may include passenger cars, crossover vehicles, sports-utility vehicles, recreational vehicles, trucks, buses, commercial vehicles, etc.

An electric vehicle 12 may operate by expending electrical energy from an energy storage device, such as a vehicle battery, to power an electric motor during a period of propulsion. After a prolonged period of energy depletion, the vehicle battery may require re-charging before continued propulsion may resume. Such re-charging may occur by coupling the vehicle battery to a source of electrical power either directly, or through one or more intermediate components.

In general, the electric vehicle charging station 10 may be a stationary apparatus that may be disposed in a parking lot or other vehicle storage area that includes a plurality of vehicle parking spaces 14 (e.g., parking garage, valet parking area, fleet vehicle storage area, etc. . . . ). As used herein, a parking space 14 is an area that is intended to receive a vehicle for a period of time. Parking spaces 14 may be delineated by visual indicators 16 provided on the ground (e.g., as with a parking lot), or by physical objects (as occurs at a conventional gas station where a plurality of gasoline pumps crudely delineate the respective parking spaces that are intended to receive a vehicle for refueling).

Figure 2:
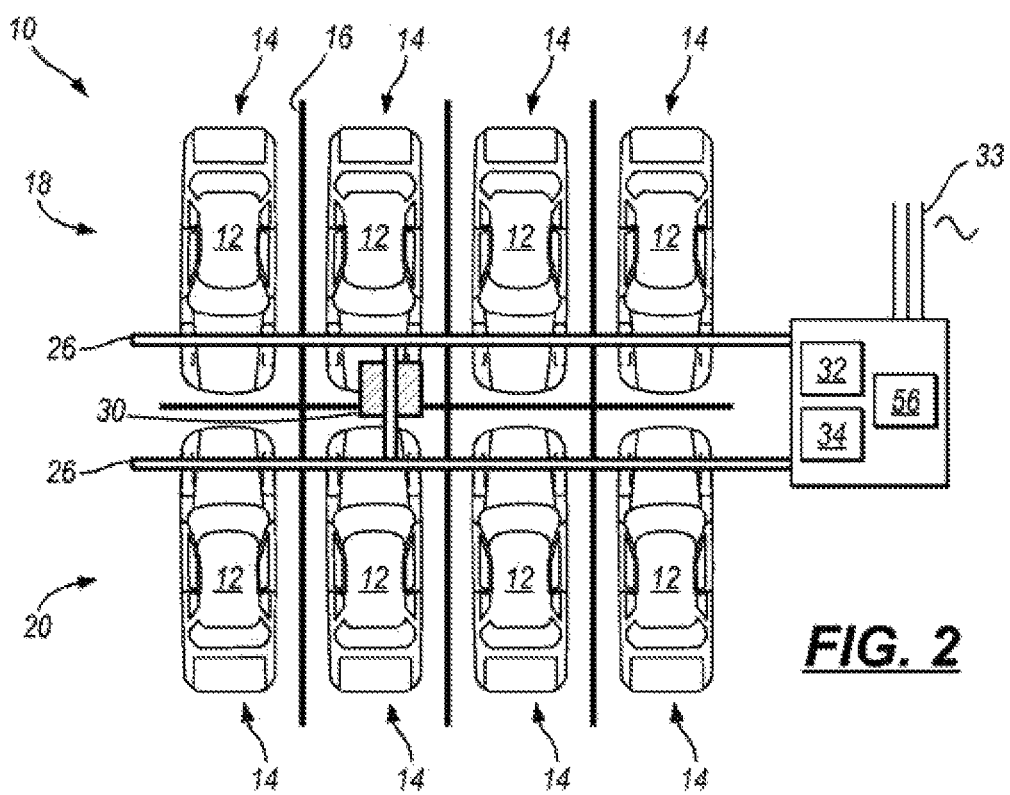
FIG. 2 is a schematic plan view of an electric vehicle charging station employing an overhead mounted movable charging apparatus.

FIGS. 1 and 2 each illustrate a recharging area that includes eight parking spaces 14, organized into two rows 18, 20 of four spaces 14. Each charging station 10 may include a respective track 24, 26 that extends across a plurality of the parking spaces 14 (e.g., along each row 18, 20), and allows a movable charging apparatus 28, 30 to access each vehicle 12 to facilitate selective recharging of the vehicle's battery.

In general, the track 24, 26 may have two general configurations, namely a ground-level track 24 (as shown in FIG. 1), and an overhead track 26 (as shown in FIG. 2). Regardless of the specific configuration, each track 24, 26 may support its respective movable charging apparatus 28, 30, and allow the charging apparatus 28, 30 to translate along the track 24, 26 to access each vehicle 12 in the station 10. As will be described in greater detail below, the charging apparatus 28, 30 may be coupled with a power supply circuit 32 and charging controller 34 that may each be used by the charging apparatus 28, 30 to recharge a battery of one or more of the parked electric vehicles 12.

Figure 3:
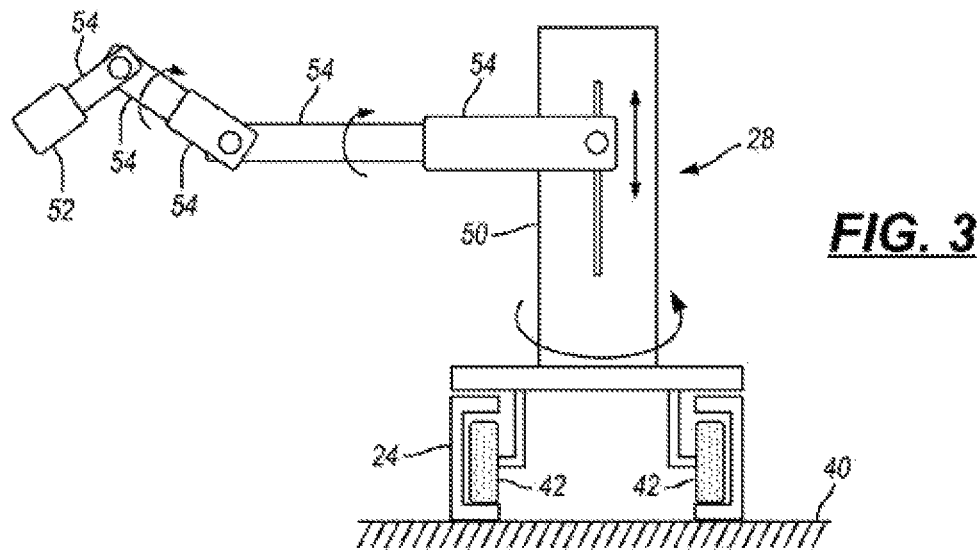
FIG. 3 is a schematic side view of a ground mounted movable charging apparatus.
Figure 4:
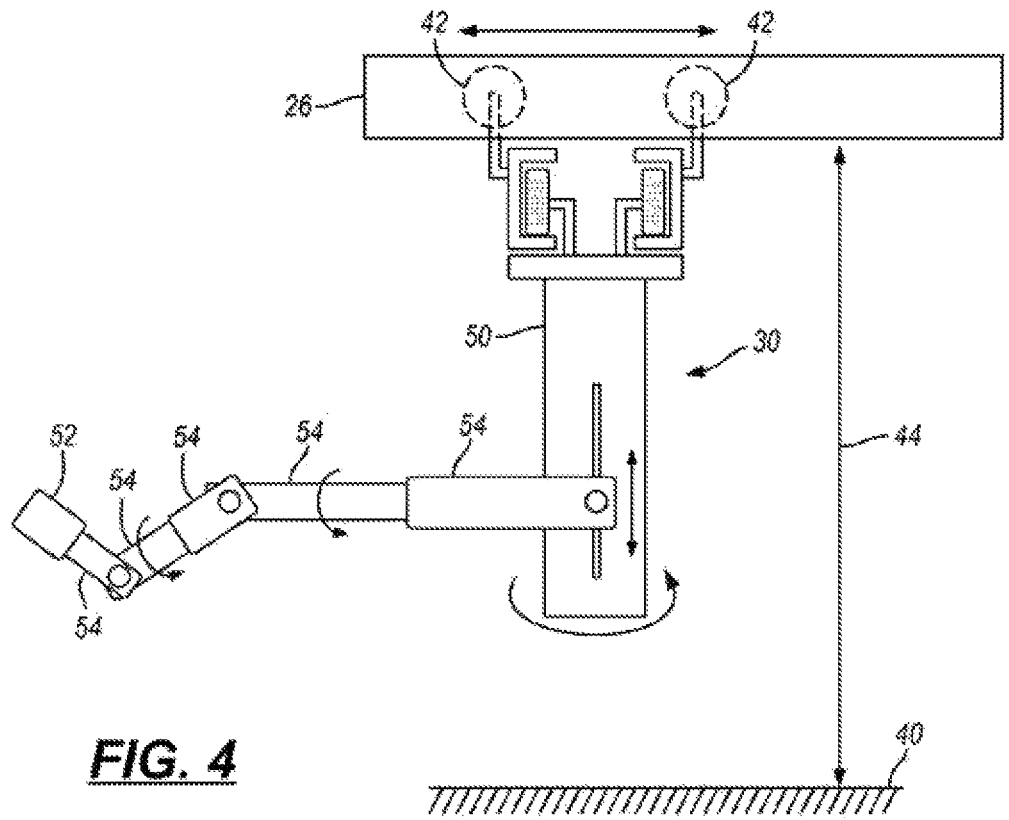
FIG. 4. is a schematic side view of an overhead mounted movable charging apparatus.

FIGS. 3 and 4 illustrate schematic examples of a ground-level track 24 and overhead track 26 (respectively) that are used to support a respective movable charging apparatus 28, 30. As shown in FIG. 3, the ground-level track 24 may be disposed on the ground 40, or substantially on the ground 40 such that the movable charging apparatus 28 is generally disposed above the track 24. The movable charging apparatus 28 may translate along the track 24, for example, using one or more wheels 42 that are configured to ride on or within a portion of the track 24. The ground-level track 24 may permit the charging apparatus 28 to physically translate between the respective vehicles 12, though may require a minimum clearance between the rows 18, 20 that is commensurate with the width of the track 24/charging apparatus 28.

Referring to FIG. 4, the overhead track 26 may be disposed at a distance 44 above the ground 40 that is, for example, between 1.50 and 3.65 meters. The charging apparatus 30 may generally hang from the track 26 such that the charging apparatus 30 is generally located between the track 26 and the ground 40. While the overhead track 26 may be beneficial from a land-use perspective by allowing the rows 18, 20 to be spaced closer together, the ground-level track 24 may require less infrastructure to implement. In one configuration the overhead track 26 may be hung from a plurality of existing light poles within the parking lot.

Regardless of the form of the track, the movable charging apparatus 28, 30 may generally include a base 50 that is slidably coupled to the track, and an end effector 52 that is mechanically coupled to the base 50. The end effector 52 may be configured to electrically couple with one of the vehicles 12 disposed within an adjacent parking space 14. A description of various embodiments of an end effector 52 may be found herein with reference to FIGS. 9-15.

With continued reference to FIGS. 3 and 4, in one configuration, the end effector 52 may be in mechanical communication with the base 50 through a plurality of rigid arm members 54 that may be capable of articulating and/or translating relative to each other. In other configurations, however, the end effector 52 may be mechanically coupled to the base 50 through a flexible electrical cable.

In a basic implementation of the present charging station 10, the end effector 52 may manually positioned/manipulated into electrical communication with a vehicle 12 by a user. For example, if a user wishes to charge his/her vehicle 12, they may slide the charging apparatus 28, 30 to an area proximate to their vehicle 12, and manually place the end effector into electrical communication with a suitable charging receptacle disposed on their vehicle (i.e., where a charging receptacle is meant to generally refer to an electrical connection/plug disposed on the vehicle and in electrical communication with an electrical storage device, such as a battery). In this implementation, any joints provided between the arm members 54 may be purely passive and may allow a user to freely manipulate the end effector 52.

In another configuration, the vehicle charging station 10 may be fully automated, and may be configured to robotically charge a user's vehicle 12 with minimal interaction from the user. In one configuration, the user's involvement in the charging process may be limited to providing an indication of a desired charge and/or enabling the charging apparatus 28, 30 to gain access to a charging receptacle.

In a robotic implementation, the position and orientation of the end effector 52 may be robotically controlled in 5 or more degrees of freedom (for example, 3 translation degrees, and 2 or more rotational degrees) through the selective actuation of one or more joint actuators disposed between one or more arm members 54. The joint actuators and resultant motion of the end effector 52 may be controlled by a robotic controller 56, such as schematically shown in FIGS. 1 and 2. While the following description generally relates to a robotic implementation of the present system 10, certain aspects may similarly be used in a manual version of the system 10 (particularly those that are implemented by the charging controller 34).

Each of the robotic controller 56 and charging controller 34 may be embodied as one or multiple digital computers or data processing devices, having one or more microcontrollers or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, and/or signal conditioning and buffering electronics. The robotic controller 56 and charging controller 34 may be embodied as distinct software modules within a single computing device, or may be embodied as physically separate hardware modules.

The charging controller 34 may be configured to automatically perform one or more charging control algorithms to carry out a charging procedure if the controller 34 determines that a vehicle requires an electric charge. In a similar manner, the robotic controller 56 may be configured to automatically perform one or more motion control algorithms to control the resultant motion of the end effector 52 via the one or more joint motors to effectuate the charging process. Each control/processing routine may be embodied as software or firmware, and may either be stored locally on the respective controller 56, 34, or may be readily assessable by the controller 56, 34.

Figure 5:
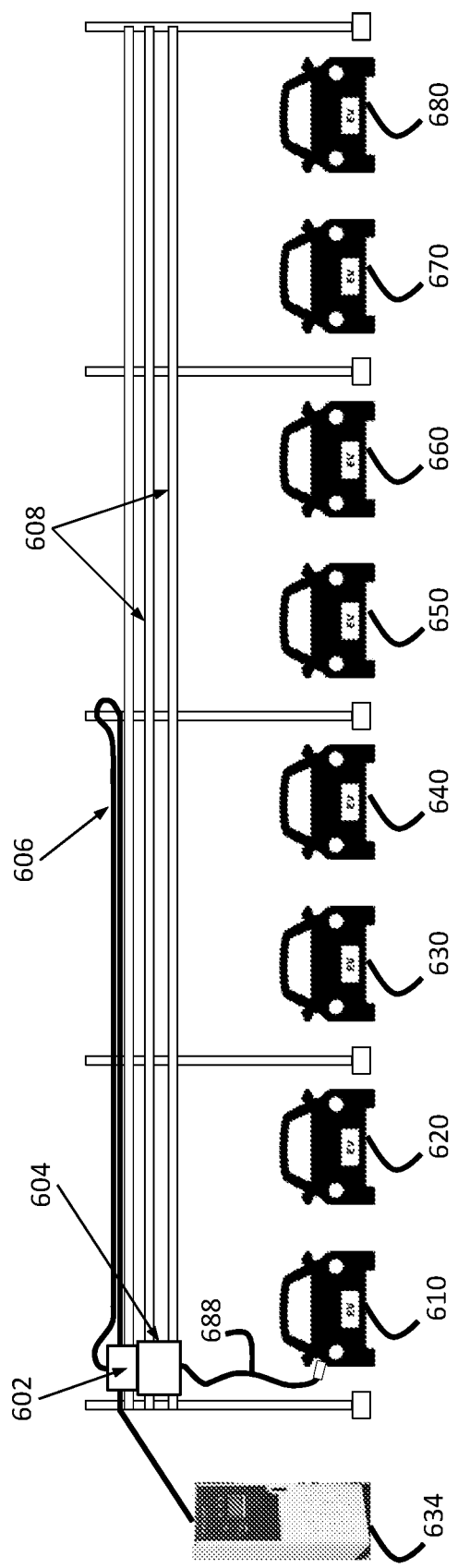
FIG. 5 is a front view of an exemplary overhead mounted one-to-many charging station.

One issue that can occur in such a charging system is that the power delivery system should be flexible, have a long reach, low resistance, and be scalable. With reference to FIG. 5, a side view of a charging system featuring an overhead charger (such as that presented in FIG. 2), is illustrated. In this view, the cabling used to power the vehicles is more explicitly shown. A charging controller 634 is coupled to a charger 602 and a driving unit 604. Charging controller 634 controls the operation of charger 602 and/or driving unit 604. In some embodiments, a user interacts with charging controller 634 to provide account information, payment information, or to select charging options (such as the amount of charge requested). Driving unit 604 is mechanically coupled to charger 602 such that lateral movement of driving unit 604 results in lateral movement of charger 602. Driving unit 604 can contain mechanisms that allow the movement of both driving unit 604 and charger 602. Mechanisms can include one of a variety of motorized mechanisms that move or assist in the movement of driving unit 604 and charger 602 laterally along guide rails (also known as tracks) 608, to which driving unit 604 is movably coupled. In such a manner, charger 602 and driving unit 604 can be moved between vehicles (such as vehicles 610, 620, 630, 640, 650, 660, 670, and 680).

A cable 688 can be used to couple an electric vehicle (such as vehicle 610) to driving unit 604. A cable 606 is provided to couple the charger 602 to charging controller 634. Charger 602 and driving unit 604 are movably coupled to guide rails 608 such that, as charger 602 and drive unit 604 are moved from one vehicle to another vehicle, cable 606 also has to move, bending and otherwise causing wear to cable 606.

Because of the large amounts of power flowing through cable 606, cable 606 should be of sufficient size to transmit the power. An exemplary charger may supply 500 volts of power at 125 amps. A cable sufficient to carry such power is approximately 29 to 32 mm in diameter. And the weight of such a cable can be between 1.46 and 1.57 kilograms per meter. A typical parking space is approximately 2.6 meters in width. Thus, a cable sufficient to reach eight parking spaces can be nearly 21 meters in length, which means a weigh of as much as 33 kilograms. As cables become thicker, they become more unwieldly and less flexible. This problem can be exacerbated in cold weather.

One or more embodiments address the above-described issue through the use of a power delivery system that includes one or more contact wires coupled to a charger through the use of conductor poles. Such a system can include one of several different embodiments. For example, the contact wires can be above ground, at ground level, or underground. In addition, there can be more than one charger and/or drive unit coupled to the contact wires. Various types of coupling systems can be included to couple the contact wires to the conductor poles.

Figure 6:
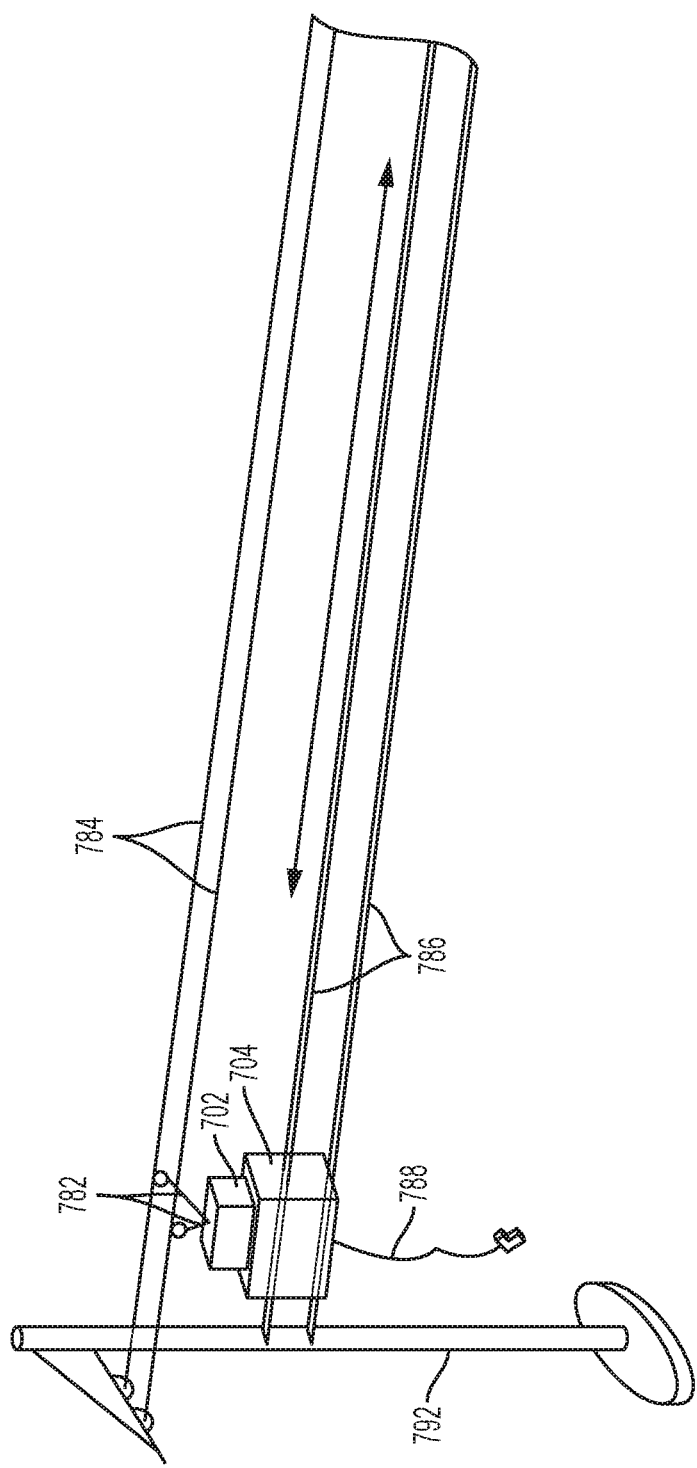
FIG. 6 is an orthogonal view of an exemplary overhead mounted charging station of one or more embodiments.

With reference to FIG. 6, an orthogonal view of an embodiment is presented. As with FIG. 5, there is a charger

702 and a drive unit 704. Coupled to drive unit 704 is a cable 788, which is used to couple an electric vehicle to drive unit 704 to commence charging.

Charger 702 and drive unit 704 are powered through the use of contact wires 784. Charger 702 is coupled to contact wires 784 through the use of conductor poles 782. Conductor poles 782 are arranged such that they are movable with charger 702 and drive unit 704 in such a manner that conductor pole 782 can couple to contact wires 784 in a variety of different locations along a width of the contact wire, such as in proximity to a vehicle parking space. In one or more embodiments, two contact wires are provided to provide power and a return. Charger 702 and drive unit 704 are movably coupled to guide rails 786. While two guide rails 786 are illustrated in FIG. 7, it should be understood that a greater or lesser number of guide rails can be used. Guide rails 786 perform a function similar to those provided by track 26 of FIG. 2. While a straight layout is shown in FIG. 6, other layouts are possible, such as circle, oval, U-shape, L-shape, square, rectangle, or any other shape. In addition, while only a single charger 702 and drive unit 704 are illustrated in FIG. 6, there can be multiple sets of chargers and drive units.

FIGS. 7A-7C present additional views of the embodiment presented in FIG. 6. FIG. 7A is a front view, FIG. 7B is a side view, and FIG. 7C is a top view. As with FIG. 5, there is a charger 802 and a drive unit 804. Coupled to drive unit 804 is a cable 888, which is used to couple an electric vehicle 810 to 880 to drive unit 804 to commence charging.

Charger 802 and drive unit 804 are powered through the use of contact wires 884. Charger 802 is coupled to contact wires 884 through the use of conductor poles 882. In one or more embodiments, two contact wires are provided to provide power and a return. Charger 802 and drive unit 804 are movably coupled to guide rails 886. While two guide rails 886 are illustrated in FIG. 7A, it should be understood that a greater or lesser number of guide rails can be used. Guide rails 886 perform a function similar to those provided by track 26 of FIG. 2. While a straight layout is shown in FIGS. 7A-7C, other layouts are possible, such as circle, oval, U-shape, L-shape, square, rectangle, or any other shape. In addition, while only a single charger 802 and drive unit 804 are illustrated in FIGS. 7A-7C, there can be multiple sets of chargers and drive units.

Additional configurations are possible for an overhead contact system. With reference to FIGS. 8A-8B, one such configuration is shown. FIG. 8A is a side view of the configuration.

Charger 902 and drive unit 904 are powered through the use of contact wires 984. Charger 902 is coupled to contact wires 984 through the use of conductor poles 982. In one or more embodiments, two contact wires are provided to provide power and a return. In the embodiment shows in FIGS. 8A-8B, the two contact wires 982 are in a substantially vertical orientation with respect to each other. Charger 902 and drive unit 904 are movably coupled to guide rails 986. While two guide rails 986 are illustrated in FIG. 8A, it should be understood that a greater or lesser number of guide rails can be used. Guide rails 986 perform a function similar to those provided by track 26 of FIG. 2.

Figures 9A, 9B, 9C:
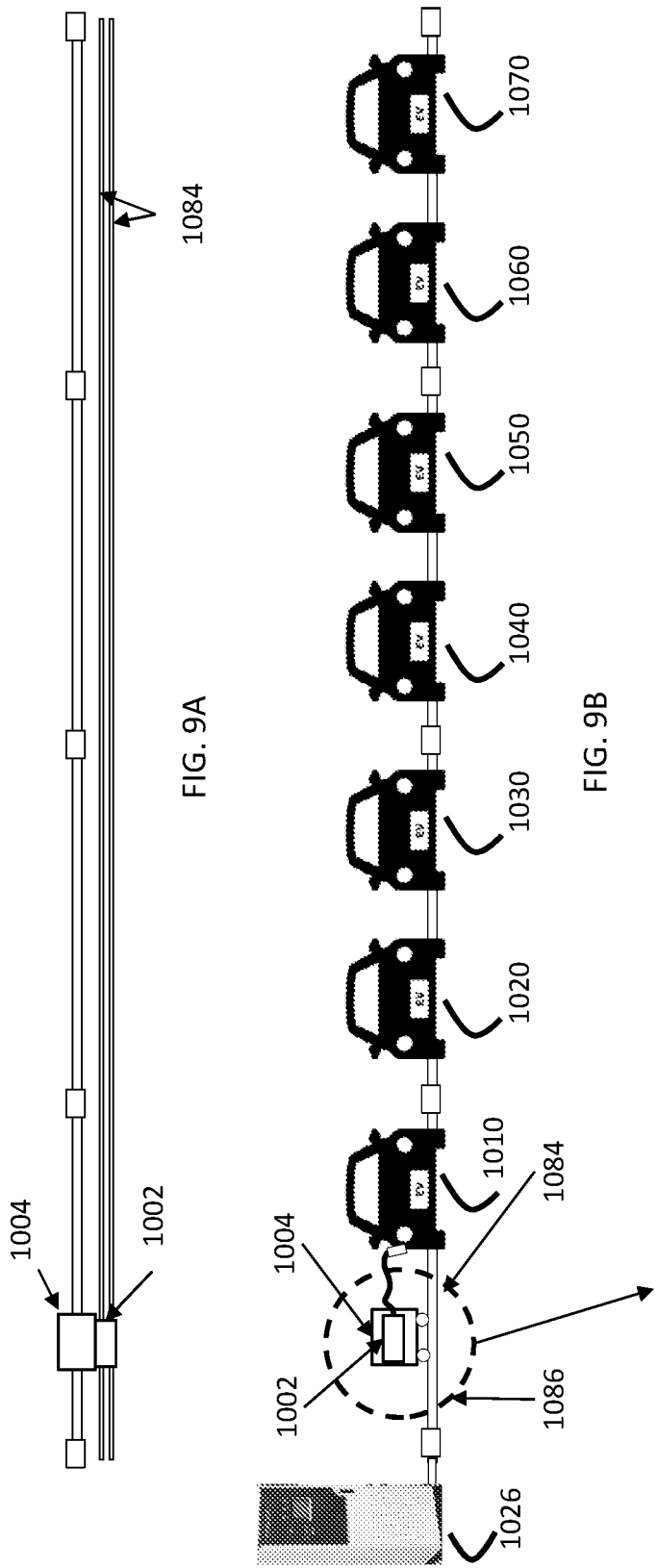
FIG. 9A is a top view of an exemplary ground level charging station of one or more embodiments.
FIG. 9B is a front view of an exemplary ground level charging station of one or more embodiments.
FIG. 9C shows the front view in more detail.

With reference to FIGS. 9A, 9B, and 9C, a ground-level charging system is presented. In some respects, this system is similar to the system presented with respect to FIG. 1. FIG. 9A shows a top view and FIG. 9B shows a front view. FIG. 9C shows a portion of FIG. 9B in greater detail.

Charger 1002 and drive unit 1004 are powered through the use of contact wires 1084. Charger 1002 is coupled to contact wires 1084 through the use of conductor poles 1082. In one or more embodiments, two contact wires are provided to provide power and a return. Charger 1002 and drive unit 1004 are movably coupled to guide rails 1086. It should be understood that a greater or lesser number of guide rails can be used. Guide rails 1086 perform a function similar to those provided by track 24 of FIG. 1. It should be understood that charger 1002 and drive unit 1004 can be positioned in front of the vehicles to be charged (e.g., vehicle 1010, 1020, 1030, 1040, 1050, 1060, or 1070) or behind the vehicle to be charged. It should be understood that more than one charger and drive unit can be used in some embodiments.

Figure 10:
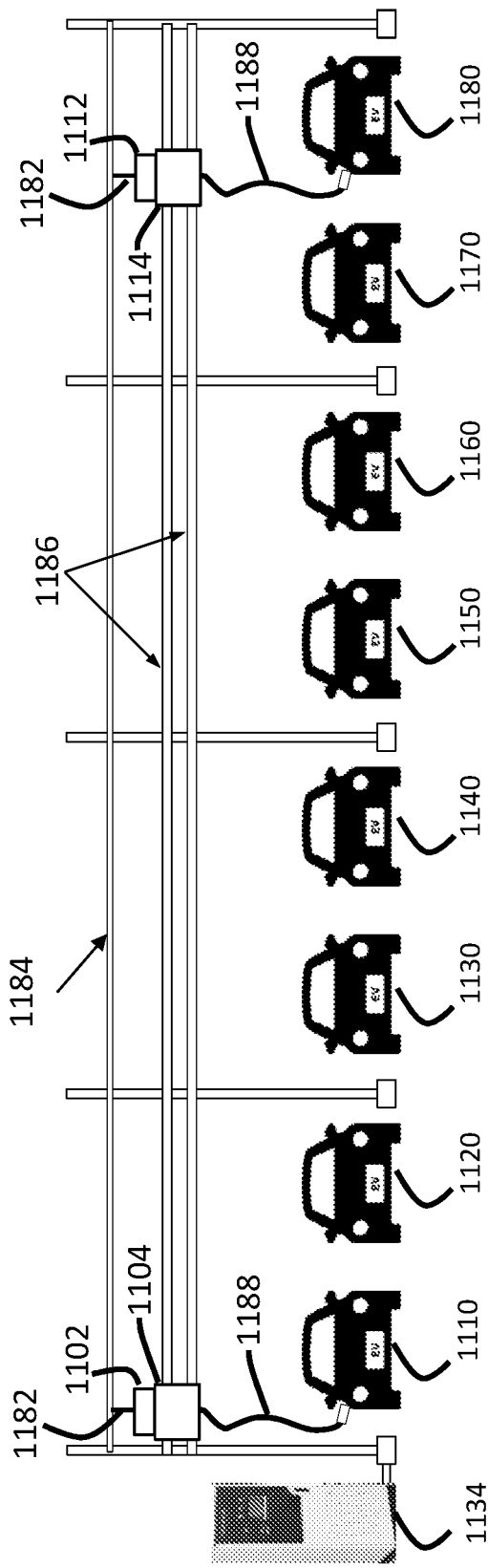
FIG. 10 is a front view of an exemplary overhead mounted charging station of one or more embodiments.

With reference to FIG. 10, a front view of an additional embodiment is presented. As with FIG. 7, there is a charger 1102 and a drive unit 1104. Coupled to drive unit 1104 is a cable 1188, which is used to couple an electric vehicle to charger 1102 to commence charging.

Charger 1102 and drive unit 1104 are powered through the use of contact wires 1184. Charger 1102 is coupled to contact wires 1184 through the use of conductor poles 1182. In one or more embodiments, two contact wires are provided to provide power and a return. Charger 1102 and drive unit 1104 are movably coupled to guide rails 1186. There is also a second charger 1112 and drive unit 1114 that is movably coupled to guide rails 1186. Such a configuration allows two vehicles to be charged at one time. While two guide rails 1186 are illustrated in FIG. 10, it should be understood that a greater or lesser number of guide rails can be used. Guide rails 1186 perform a function similar to those provided by track 26 of FIG. 2. While a straight layout is shown in FIG. 11, other layouts are possible, such as circle, oval, U-shape, L-shape, square, rectangle, or any other shape.

The configuration of contact wires of various embodiments can take one of several different forms. With reference to FIGS. 11A, 11B, and 11C, one or more embodiments are shown. FIG. 11A is a front view of an embodiments illustrating a contact wire configuration of one or more embodiments. FIG. 11B is a front view of a contact wire in more detail. FIG. 11C is a sectional view of the contact wire.

Charger 1202 and drive unit 1204 are powered through the use of contact wires 1284. Charger 1202 is coupled to contact wires 1284 through the use of conductor poles 1282. In one or more embodiments, two contact wires are provided to provide power and a return. Charger 1202 and drive unit 1204 are movably coupled to guide rails 1286. While two guide rails 1286 are illustrated in FIG. 11A, it should be understood that a greater or lesser number of guide rails can be used. Guide rails 1286 perform a function similar to those provided by track 26 of FIG. 2. While a straight layout is shown in FIG. 11A, other layouts are possible, such as circle, oval, U-shape, L-shape, square, rectangle, or any other shape. Vehicles 1210, 1220, 1230, 1240, 1250, 1260, 1270, and 1280 are able to be charged via charger 1202 and 1204.

As shown in greater detail in the insets provided as FIG. 11B and FIG. 11C, contact wire 1284 is surrounded by insulator 1274. In some embodiments, insulator 1274 can be formed of a rubber. Other insulating materials also can be used. Portions of insulator are removed, forming cutouts 1276. The cutouts can be locations that correspond to parking positions for vehicles 1210, 1220, 1230, 1240, 1250, 1260, 1270, and 1280. In such a manner, contact wire 1284 is protected and also helps to prevent inadvertent electrical shocks. In some embodiments, contact wire 1284 is a metal such as copper or aluminum.

With reference to FIG. 12A through 12C, a contact wire connecting apparatus is shown in greater detail. A conductor pole (such as conductor pole 1382) can couple to a contact wire (such as contact wire 1384) in one of a variety of different manners. In one or more embodiments, a contact wire connecting apparatus is used. FIG. 12A shows a front view of conductor pole 1382 while in a connected state. Contact wire 1384 is similar to contact wire 1284 and serves to conduct electricity for use by a charger and drive unit (not illustrated) via conductor pole 1382. The coupling can take place in a cutout of the contact wire, such as cutout 1276 (of FIG. 11).

As shown in FIG. 12A, as the conductor pole moves upward (in the direction indicated by arrow 1354), connection pads 1352 close around contact wire 1384, serving to couple conductor pole 1382 with contact wire 1384. The connection pads may partially wrap around contact wire 1384. As shown in FIG. 12B, as the conductor pole moves downward (in the direction indicated by arrow 1356), the connection pads 1352 open around contact wire 1384, disengaging contact wire 1384, serving to uncouple conductor pole 1382 from contact wire 1384. A side view of an embodiment is shown in FIG. 12C. The engaging and disengaging movement can be made electromagnetically or mechanically or via any other type of system.

In addition to the concepts identified above, the presently described electric vehicle charging station may employ methods and systems disclosed in U.S. patent application Ser. No. 13/484,345 (U.S. patent publication 2013/0076902, titled "Robotically Operated Vehicle Charging Station") and U.S. patent application Ser. No. 14/275,954 (U.S. patent publication 2014/0354229, titled "Electric Vehicle Charging Station"). The content of both the above are hereby incorporated by reference in their entirety.

While the foregoing has been described with reference to exemplary embodiments, it will be understood by those skilled in the art that various changes may be made and equivalents may be substituted for elements thereof without departing from the scope. In addition, many modifications may be made to adapt a particular situation or material to the teachings without departing from the essential scope thereof. Therefore, it is intended that the disclosure not be limited to the particular embodiments disclosed, but that all embodiments fall within the scope of the application.

What is claimed is:

1. A vehicle charging station comprising:
   a track configured to extend across a plurality of vehicle parking spaces;
   a movable charging apparatus supported by the track and translatable along the track between the plurality of vehicle parking spaces, wherein the movable charging apparatus comprises a charger and a driving unit configured to move the movable charging apparatus along the track;
   a first contact wire and a second contact wire extending approximately parallel to the track, the first and second contact wires comprising a metal wire wrapped by an insulator with a plurality of cutouts that correspond to each of the plurality of vehicle parking spaces;
   a first conductor pole comprising a pair of first connection pads coupled thereto and configured to connect and disconnect, via the pair of first connection pads by wrapping and unwrapping around the first contact wire when in a connected position, the charger of the movable charging apparatus to the first contact wire at a plurality of locations along a width of the first contact wire, the first conductor pole coupling to the first contact wire via one of the plurality of cutouts thereon;
   a second conductor pole comprising a pair of second connection pads coupled thereto and configured to connect and disconnect, via the pair of second connection pads by wrapping and unwrapping around the second contact wire when in another connected position, the charger of the movable charging apparatus to the second contact wire at a plurality of locations along a width of the second contact wire, the second conductor pole coupling to the second contact wire via one of the plurality of cutouts thereon,
   wherein the first and second contact wires are provided to provide a power and a return to the movable charging apparatus,
   wherein the first and the second conductor poles are configured to move with the movable charging apparatus, and
   wherein the first and second pair of connection pads are configured to move between the connected and disconnected state via vertical movement of the first and second conductor poles, respectively.

2. The vehicle charging station of claim 1, wherein the track is disposed on the ground.

3. The vehicle charging station of claim 1, wherein the track is disposed above the ground, such that the movable charging apparatus is substantially located between the ground and the track.

4. The vehicle charging station of claim 1, wherein:
   the second contact wire comprises a wire wrapped by an insulator; and
   the insulator comprises a plurality of cutouts that correspond to each of the plurality of vehicle parking spaces, such that the second conductor pole couples to the first contact wire via one of the plurality of cutouts.

5. The vehicle charging station of claim 1, wherein the driving unit comprises a motor configured to move the movable charging apparatus along the track.

6. The vehicle charging station of claim 1, further comprising a second movable charging apparatus supported by the track and translatable along the track between the plurality of vehicle parking spaces.

7. The vehicle charging station of claim 1, wherein:
   the metal wire is selected from copper and aluminum; and
   the insulator comprises rubber.

8. The vehicle charging station of claim 1, wherein the pair of connection pads are movable via a mechanical coupling to the conductor pole.

9. The vehicle charging station of claim 1, wherein the pair of connection pads are movable via an electromagnetic coupling to the conductor pole.

10. The vehicle charging station of claim 1, wherein:
    the first conductor pole is configured to be movable along the width of the contact wire while in a disconnected state.

* * * * *